(12) United States Patent
Kadoya et al.

(10) Patent No.: US 11,233,467 B2
(45) Date of Patent: Jan. 25, 2022

(54) MOTOR CONTROL DEVICE

(71) Applicant: MITSUBA Corporation, Gunma (JP)

(72) Inventors: Akira Kadoya, Gunma (JP); Kenichi Hirano, Novi, MI (US); Justin Valencia, Novi, MI (US)

(73) Assignee: MITSUBA Corporation, Gunma (JP)

( * ) Notice: Subject to any disclaimer, the term of this patent is extended or adjusted under 35 U.S.C. 154(b) by 10 days.

(21) Appl. No.: 15/842,901

(22) Filed: Dec. 15, 2017

(65) Prior Publication Data

US 2018/0183361 A1 Jun. 28, 2018

(30) Foreign Application Priority Data

Dec. 27, 2016 (JP) .............................. JP2016-254015

(51) Int. Cl.
*B60W 50/04* (2006.01)
*H02P 6/10* (2006.01)
*H02P 3/12* (2006.01)
*H02P 6/06* (2006.01)
*H02P 27/08* (2006.01)
*H02P 6/17* (2016.01)

(52) U.S. Cl.
CPC ................ *H02P 3/12* (2013.01); *H02P 6/06* (2013.01); *H02P 6/17* (2016.02); *H02P 27/08* (2013.01)

(58) Field of Classification Search
CPC ...... B60R 21/0134; B60R 16/037; B60R 1/12
See application file for complete search history.

(56) References Cited

U.S. PATENT DOCUMENTS

2005/0057203 A1* 3/2005 Shimizu ............... H01H 3/0213
318/268
2006/0107598 A1* 5/2006 Imai .......................... B60J 5/06
49/360
(Continued)

FOREIGN PATENT DOCUMENTS

CN 104221275 12/2014
CN 105579322 5/2016
(Continued)

OTHER PUBLICATIONS

"Office Action of China Counterpart Application", dated Sep. 28, 2020, with English translation thereof, pp. 1-15.
(Continued)

*Primary Examiner* — Kawing Chan
*Assistant Examiner* — Charles S Laughlin
(74) *Attorney, Agent, or Firm* — JCIPRNET (57) ABSTRACT

Provided is a motor control device which can accurately perform velocity control over a sliding door. The motor control device has a control unit which determines a command value for a duty ratio such that a moving velocity of the sliding door of a vehicle follows a target velocity set in advance while the sliding door is being opened and closed. The motor control device includes a plurality of upper stage switching elements that are connected between terminals of windings of the electric motor and the power source, and a plurality of lower stage switching elements that are connected between the terminals and a ground potential. The control unit causes all the upper stage switching elements or all the lower stage switching elements to be in a turned-on state in accordance with the command value.

1 Claim, 9 Drawing Sheets

(56) References Cited

U.S. PATENT DOCUMENTS

2015/0061561 A1* 3/2015 Roppongi ................ H02P 6/24
                                                    318/470
2016/0215554 A1* 7/2016 Uno ........................ E05F 15/60
2017/0081900 A1* 3/2017 Watanabe ................ B60J 5/101

FOREIGN PATENT DOCUMENTS

| JP | 2006333691 | 12/2006 |
| JP | 2014-194151 | 10/2014 |

OTHER PUBLICATIONS

"Office Action of Japan Counterpart Application", dated Mar. 27, 2020, with English translation thereof, p. 1-p. 13.
Office Action of China Counterpart Application, with English translation thereof, dated Mar. 17, 2021, pp. 1-11.

* cited by examiner

MOTOR CONTROL DEVICE

CROSS-REFERENCE TO RELATED APPLICATION

This application claims the priority benefit of Japanese Patent Application Serial No. 2016-254015, filed on Dec. 27, 2016. The entirety of the above-mentioned patent application is hereby incorporated by reference herein and made a part of this specification.

BACKGROUND

Technical Field

The present disclosure relates to a motor control device.

Related Art

In the related art, as disclosed in Patent Document 1, when a sliding door of a vehicle is opened and closed using an electric motor, driving of the electric motor is controlled by controlling a pulse width modulation (PWM).

[Patent Document 1] Japanese Patent Application Laid-Open (JP-A) No. 2014-194151

However, it is assumed in a situation where the sliding door is heavy in weight and in a situation in which the sliding door is accelerated due to an external force (for example, on a steep slope), the sliding door is not to be able to be fully controlled (for example, the sliding door moves in excess of a target velocity) with only PWM control of the related art in a situation in which the sliding door is controlled to stop halfway between a fully open position and a fully closed position.

SUMMARY

According to an exemplary embodiment of the present disclosure, there is provided a motor control device having a control unit which determines a command value for a duty ratio that is a ratio of a time during which a power source energizes an electric motor to a predetermined control cycle such that a moving velocity of a sliding door of a vehicle follows a target velocity set in advance while the sliding door is being opened and closed, and controls the moving velocity of the sliding door by executing energizing control over the electric motor based on the determined command value when controlling driving of the electric motor for opening and closing the sliding door. The motor control device includes a plurality of upper stage switching elements that are connected between terminals of windings of the electric motor and the power source, and a plurality of lower stage switching elements that are connected between the terminals and a ground potential. The control unit causes all the upper stage switching elements or all the lower stage switching elements to be in a turned-on state in accordance with the command value.

DESCRIPTION OF THE EMBODIMENT

One or some exemplary embodiments of the invention provide a motor control device which can accurately perform velocity control over a sliding door even in a situation in which an external force affects movement of the sliding door.

In the motor control device according to one aspect of the invention, the control unit executes duty control when all the upper stage switching elements or all the lower stage switching elements are caused to be in an on state in accordance with the command value.

In the motor control device according to one aspect of the invention, the control unit switches a driving method for the plurality of upper stage switching elements and the plurality of lower stage switching elements to any one of a driving method using a pulse width modulation which is not a complementary pulse width modulation, a driving method using a complementary pulse width modulation, and a driving method in which duty control is executed when all the upper stage switching elements or all the lower stage switching elements are caused to be in an on state, in accordance with the command value.

According to one or some exemplary embodiments of the invention, velocity control over a sliding door can be accurately performed even in a situation in which an external force affects movement of the sliding door.

Figure 1:
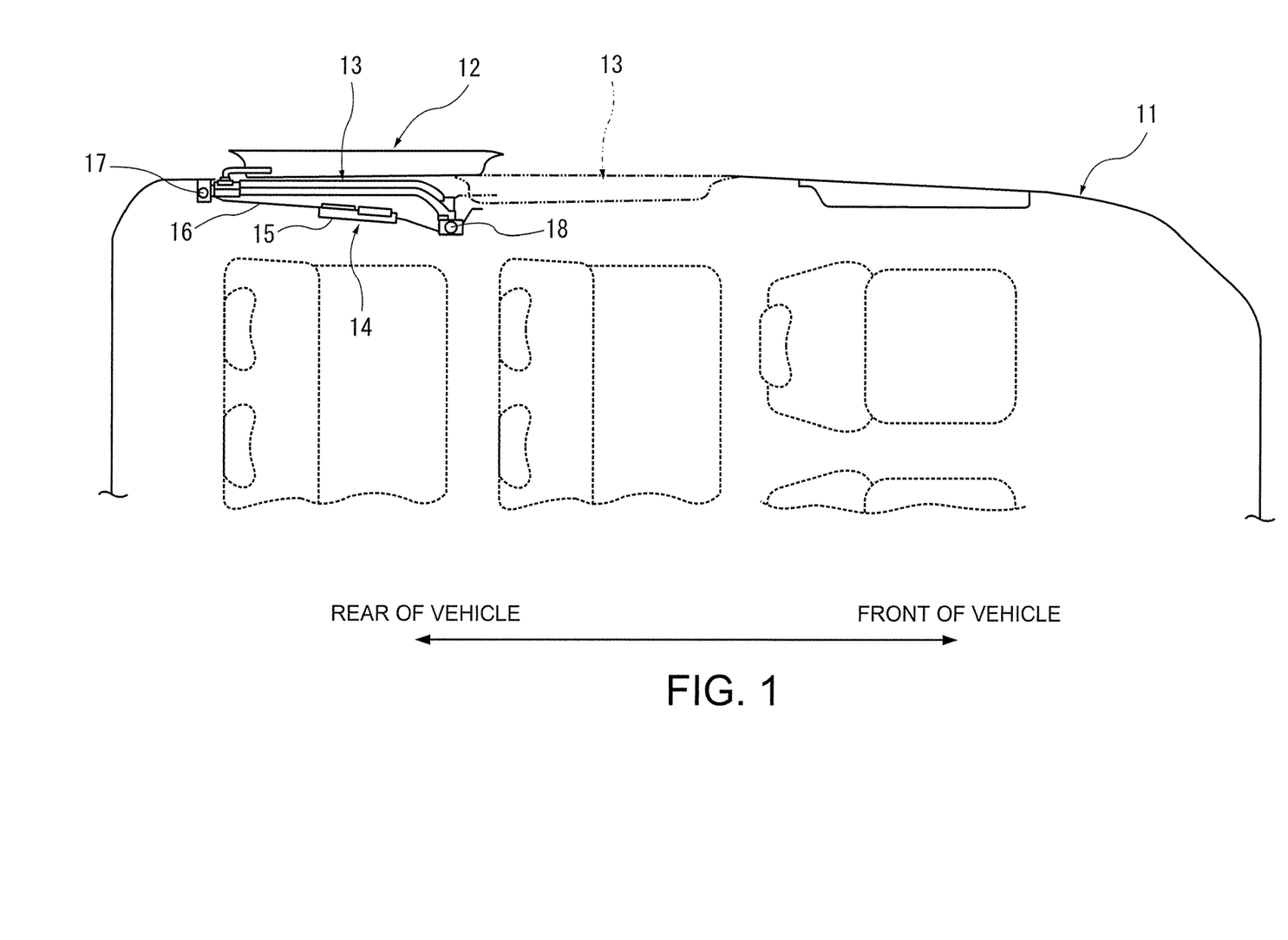
FIG. 1 is a plan view schematically illustrating a door opening/closing apparatus which includes an electric motor driven by a motor control device of the exemplary embodiment of the present disclosure.

(Configuration of door opening/closing apparatus of vehicle) FIG. 1 is a plan view schematically illustrating a door opening/closing apparatus 14 which includes an electric motor driven by a motor control device of an exemplary embodiment of the present disclosure. As illustrated in FIG. 1, a sliding door 12 (driven object) is installed on a side of a vehicle 11. The sliding door 12 is guided along a guide rail 13 fixed to the vehicle 11 and moves freely, that is, is opened and closed freely, in the forward/rearward direction of the vehicle between a fully open position indicated with a solid line and a fully closed position indicated with a chained line in the diagram.

The door opening/closing apparatus 14 is provided in the vehicle 11. The door opening/closing apparatus 14 automatically opens and closes the sliding door 12. This door opening/closing apparatus 14 has a drive unit 15 fixed to the vehicle 11. A cable 16 for driving is provided in the drive unit 15. The cable 16 is hung across an inversion pulley 17 and an inversion pulley 18 which are disposed at both ends of the guide rail 13. The cable 16 is connected to the sliding door 12 from the front side and the rear side of the vehicle 11. When any one side of the cable 16 is pulled by the drive unit 15, the sliding door 12 is pulled by the cable 16 and moves in an opening direction or a closing direction.

Figure 2:
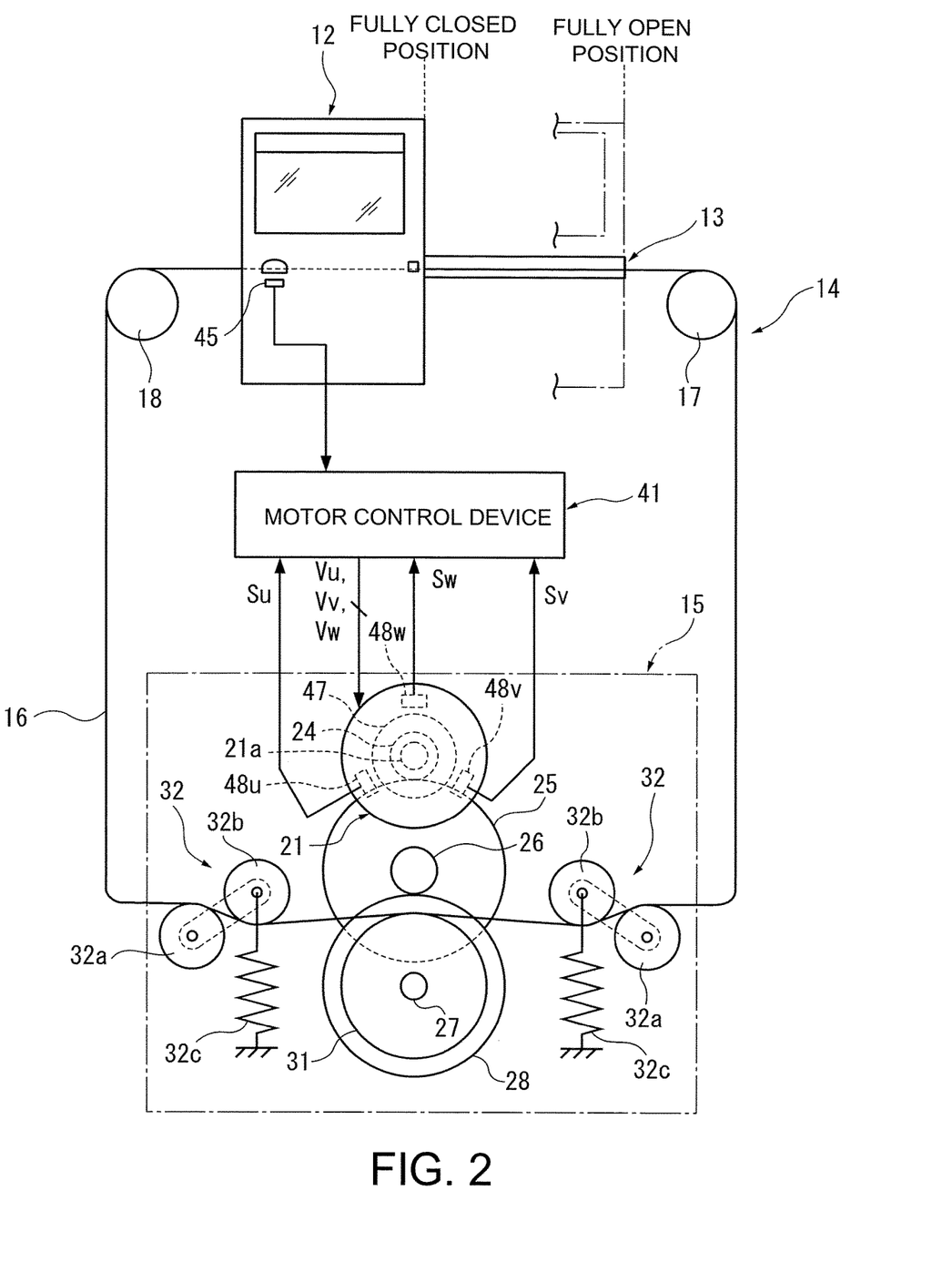
FIG. 2 is a view describing a control system of the door opening/closing apparatus illustrated in FIG. 1.

FIG. 2 is a view describing a control system of the door opening/closing apparatus 14 illustrated in FIG. 1. As illustrated in FIG. 2, an electric motor 21 is provided in the drive unit 15. In the present embodiment, a three-phase (U-phase, V-phase, and W-phase) brushless motor is used as the electric motor 21. However, the electric motor 21 is not limited to a three-phase brushless motor. For example, a DC motor may be used as the electric motor 21. The electric motor 21 is activated in accordance with a predetermined energization pattern from a motor control device 41 when an applying voltage Vu, an applying voltage Vv, and an applying voltage Vw are respectively supplied to the three phases. The rotation direction of the electric motor 21 switches between normal rotation and reverse rotation in response to whether an applying voltage to be supplied is positive or negative.

In addition, a rotor 47 (permanent magnet) is fixed to a rotary shaft 21a of the electric motor 21. In the vicinity of a rotation track of this rotor 47, three Hall integrated circuits (ICs) which are constituted of a Hall IC 48u, a Hall IC 48v, and a Hall IC 48w and serve as position sensors detecting a rotation position of the rotor 47 are provided in positions at phase intervals of 120 degrees about the rotary shaft 21a. When the rotary shaft 21a of the electric motor 21 rotates, these three Hall ICs 48u, 48v, and 48w output a pulse signal Su, a pulse signal Sv, and a pulse signal Sw shifted in phase by 120 degrees each to the motor control device 41.

In addition, a drive gear 24 is fixed to the rotary shaft 21a of the electric motor 21. A large-diameter spur gear 25 is meshed with the drive gear 24. A driven gear 28 fixed to an output shaft 27 is meshed with a small-diameter spur gear 26 which rotates integrally with the large-diameter spur gear 25. Accordingly, rotation of the electric motor 21 is reduced in velocity to a predetermined reduction ratio and is transmitted to the output shaft 27.

A cylindrical drum 31 in which a spiral guide groove (not illustrated) is formed on the outer circumferential surface is fixed to the output shaft 27. The cable 16 guided by the drive unit 15 is wound around the drum 31 multiple times along the guide groove. When the electric motor 21 is activated, the drum 31 is driven by the electric motor 21 and rotates. Accordingly, the cable 16 is activated, thereby leading to an opening/closing operation of the sliding door 12. That is, when the electric motor 21 rotates the drum 31 in the counter-clockwise direction in FIG. 2, the cable 16 on the rear side of the vehicle is wound around the drum 31, and the sliding door 12 moves in the opening direction while being pulled by the cable 16. On the other hand, when the electric motor 21 rotates the drum 31 in the clockwise direction in FIG. 2, the cable 16 on the front side of the vehicle is wound around the drum 31, and the sliding door 12 moves in the closing direction while being pulled by the cable 16. In this manner, the sliding door 12 is connected to the electric motor 21 via the cable 16, the drum 31, the output shaft 27, and the like and is driven to be opened and closed by the electric motor 21.

A tensioner 32 is provided between the drum 31 and each of two inversion pulleys 17 and 18. The tensioners 32 tense the slackness of the cable 16 between the drum 31 and the sliding door 12 to maintain the cable tension within a certain range. Each of the tensioners 32 has a fixed pulley 32a and a movable pulley 32b. A spring member 32c biases the movable pulley 32b in the rotation direction about the fixed pulley 32a serving as an axial center. The cable 16 is hung between the pulleys 32a and 32b. Therefore, when the cable 16 is loosened, the cable 16 is biased by the movable pulley 32b such that its movement path is lengthened. Accordingly, the tensile force of the cable 16 is maintained.

The drive unit 15 has a clutch-less configuration in which no clutch mechanism is provided between the electric motor 21 and the output shaft 27. In other words, the drive unit 15 is in a state in which power can be transmitted at all times from the electric motor 21 to the output shaft 27, that is, to the sliding door 12. Therefore, as will be described below, when a regenerative brake force is generated by the electric motor 21, since there is an air gap between a stator of the electric motor 21 and the rotor 47 (magnet rotor) connected to the drum 31, which are not in direct contact with each other in a mechanical sense, less vibration is caused when a regenerative brake force is generated by the electric motor 21, compared to the vibration (shock) caused due to intermittent control over a clutch mechanism.

The electric motor 21 inside the drive unit 15 is driven by the motor control device 41. This motor control device 41 controls activation of the electric motor 21 such that the sliding door 12 moves to be opened and closed at a target velocity set in advance. In addition, the motor control device 41 generates a regenerative brake force by short-circuiting input terminals 22u, 22v, and 22w (separate terminals) of the electric motor 21.

Figure 3:
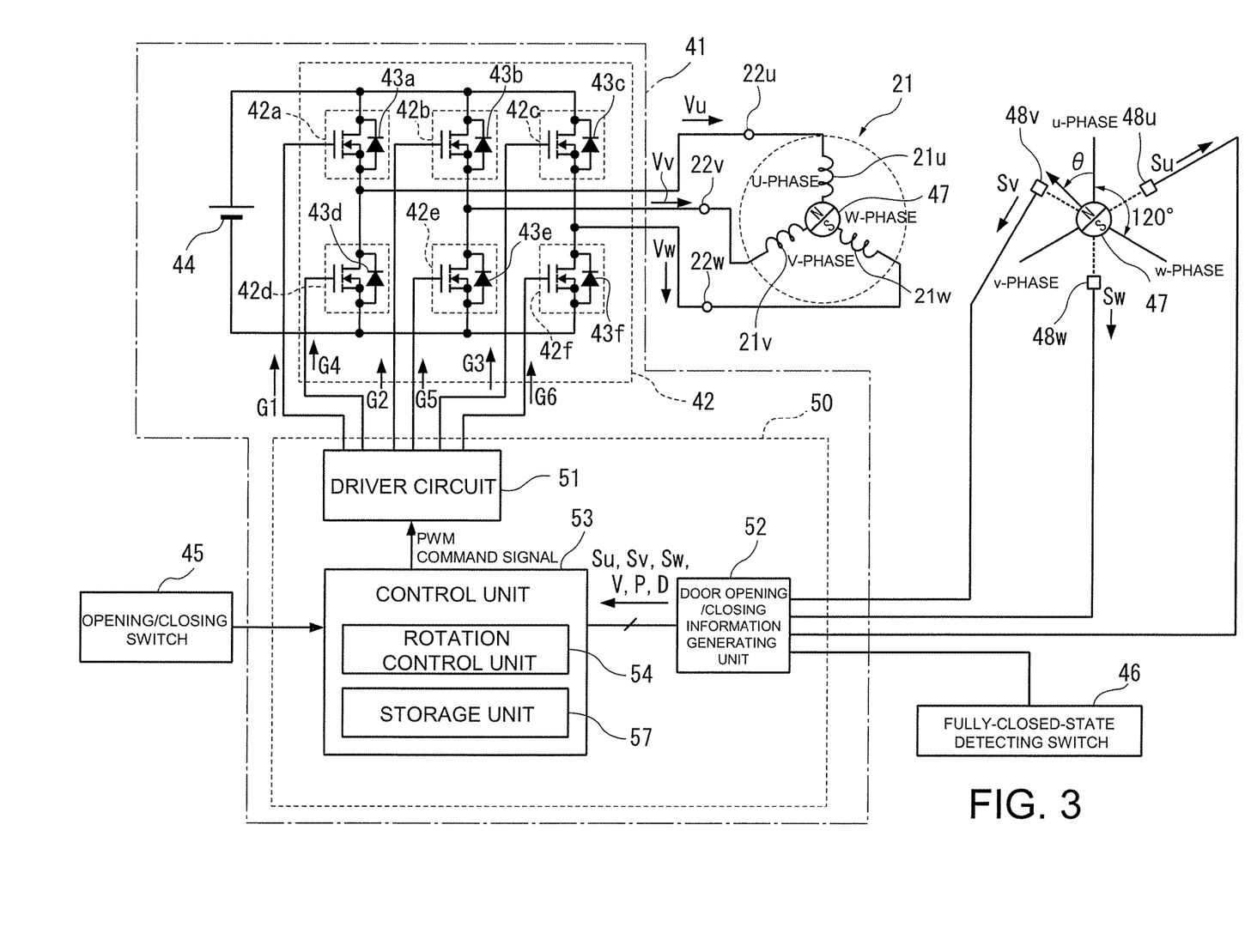
FIG. 3 is a circuit diagram illustrating details of a motor control device and an electric motor illustrated in FIG. 2.

(Configuration of motor control device) FIG. 3 is a circuit diagram illustrating details of the motor control device 41 and the electric motor 21 illustrated in FIG. 2. The electric motor 21 is a three-phase DC (direct current) brushless motor. The electric motor 21 is an inner rotor type and includes the rotor 47 (magnet rotor) in which a permanent magnet with a pair of an N pole and an S pole is embedded. In addition, the electric motor 21 includes stator windings 21u, 21v, and 21w for the U-phase, the V-phase, and the W-phase in star connection. In addition, rotation position detecting elements (Hall IC 48u, Hall IC 48v, and Hall IC 48w) are disposed near the rotor 47 every 120 degrees. These Hall ICs detect the rotation position of the rotor 47.

The motor control device 41 for controlling the electric motor 21 is configured to include a drive circuit section 42, a DC power source 44, and a control system circuit section 50.

The drive circuit section 42 includes n-channel metal oxide semiconductor field effect transistors (MOSFETs) 42a to 42f (which will hereinafter be referred to as transistors 42a to 42f) serving as six switching elements connected in a three-phase bridge form. These transistors 42a to 42f include parasitic diodes 43a to 43f connected in anti-parallel between a drain and a source. Gates of the six transistors 42a to 42f in bridge connection are connected to the control system circuit section 50.

In addition, the drains or the sources of the six transistors 42a to 42f are connected to the stator windings 21u, 21v, and 21w in star connection via the input terminals 22u, 22v, and 22w of the electric motor 21. Among the six transistors 42a to 42f, the drains of three upper stage transistors 42a to 42c (plurality of upper stage switching elements) are connected to positive electrode terminals of the DC power source 44, and the sources thereof are connected to the input terminals 22u, 22v, and 22w of the electric motor 21. In addition, the drains of three lower stage transistors 42d to 42f (plurality of lower stage switching elements) are connected to the input terminals 22*u*, 22*v*, and 22*w* of the electric motor 21, and the sources thereof are connected to a ground potential of the DC power source 44. Accordingly, the six transistors 42*a* to 42*f* perform a switching operation based on drive signals (gate signals) G1 to G6 input from the control system circuit section 50 such that power source voltages of the DC power source 44 to be applied to the drive circuit section 42 are supplied to the stator windings 21*u*, 21*v*, and 21*w* as the applying voltages Vu, Vv, and Vw in three phases (U-phase, V-phase, and W-phase). In regard to the drive signal (gate signal) G1, in the case of a high signal (H-signal), the corresponding transistor 42*a* is turned on (ON), and in the case of a low signal (L-signal), the corresponding transistor 42*a* is turned off (OFF). The same also applies to the drive signals (gate signals) G2 to G6.

In order to perform variable control over the applying voltages Vu, Vv, and Vw (more precisely, voltages and frequencies) supplied to the electric motor 21, the control system circuit section 50 forms the drive signals G1 to G6 for driving the gates of the transistors 42*a* to 42*f* of the drive circuit section 42 as pulse width modulation signals (PWM signals). The control system circuit section 50 controls the applying voltages supplied from the DC power source 44 to the stator windings 21*u*, 21*v*, and 21*w* through high-speed switching of the transistors 42*a* to 42*f*.

The control system circuit section 50 is configured to include a driver circuit 51, a door opening/closing information generating unit 52, and a control unit 53.

The control unit 53 has a rotation control unit 54 and a storage unit 57. For example, the control unit 53 is a micro-computer (which will hereinafter be referred to as a microprocessor) which includes a central processing unit (CPU), a storage device, peripheral devices, and the like and operates by executing a program stored in the storage device. In addition, in the present embodiment, the control unit 53 functions to generate PWM command signals corresponding to complementary pulse width modulations (complementary PWMs) (signals corresponding to the drive signals G1 to G6). The complementary PWM indicates an operation mode in which the transistors connected in series among the transistors 42*a* to 42*f* in bridge connection are driven in a reverse phase. For example, during a turned-on period in one cycle of a PWM in the transistor 42*a* and the transistor 42*d* connected in series, the transistor 42*a* is turned on, and the transistor 42*d* is turned off. During a turned-off period, the transistor 42*a* is turned off, and the transistor 42*d* is turned on. However, when the transistor 42*a* and the transistor 42*d* are turned on at the same time, the DC power source 44 is in a short-circuit state. Therefore, a short-circuit prevention period (dead time) is automatically inserted. In the control unit 53, a PWM cycle, whether or not to use a complementary PWM, a duty ratio for PWM control, and the like are set in a predetermined register, and PWM command signals corresponding to non-complementary PWMs (ordinary PWMs) or complementary PWMs are generated.

The rotation control unit 54 outputs PWM command signals (normal rotation commands or reverse rotation commands) for normal rotation driving or reverse rotation driving of the electric motor 21 to the driver circuit 51 based on the pulse signal Su, the pulse signal Sv, the pulse signal Sw, a velocity signal V, a position signal P, and a direction signal D input from the door opening/closing information generating unit 52. The driver circuit 51 generates the drive signals G1 to G6 for switching the transistors 42*a* to 42*f* in a predetermined energization pattern based on the input PWM command signals, and outputs the generated signals to the drive circuit section 42. Accordingly, the drive circuit section 42 (drive circuit) applies the applying voltages Vu, Vv, and Vw energizing the stator windings 21*u*, 21*v*, and 21*w* in a predetermined energization pattern to the stator windings, and rotates the rotor 47 in the rotation direction instructed by the rotation control unit 54.

More specifically, an opening/closing switch 45 is connected to the control unit 53. When an operator operates the opening/closing switch 45 and a signal commanding the control unit 53 to start opening and closing the door is input, the rotation control unit 54 generates PWM command signals in accordance with the velocity signal V, the position signal P, and the direction signal D input from the door opening/closing information generating unit 52 and outputs the generated PWM command signals to the driver circuit 51. Here, the PWM command signals are signals for turning on or off the drive signals G1 to G6 in a predetermined control cycle or turning on and off the drive signals G1 to G6 at a predetermined duty ratio. Here, the duty ratio is a proportion of the turned-on period to one cycle of PWM control and corresponds to the ratio of the time during which the DC power source 44 energizes the electric motor 21 to the predetermined control cycle. Here, the predetermined control cycle is the PWM cycle.

The door opening/closing information generating unit 52 generates the velocity signal V, the position signal P, and the direction signal D used for generating PWM command signals by the control unit 53, in accordance with the pulse signals Su, Sv, and Sw respectively output by the Hall ICs 48*u*, 48*v*, and 48*w*. When the pulse signals Su, Sv, and Sw respectively output by the Hall ICs 48*u*, 48*v*, and 48*w* are input, the door opening/closing information generating unit 52 calculates a rotation velocity of the electric motor 21, that is, a moving velocity V of the sliding door 12, based on generation intervals of pulse signals. In addition, the door opening/closing information generating unit 52 detects the rotation direction of the electric motor 21, that is, the moving direction of the sliding door 12 based on appearance timings (appearance sequence) of the pulse signals Su, Sv, and Sw and outputs the direction signal D.

In addition, the door opening/closing information generating unit 52 detects the position of the sliding door 12 by counting (integrating) switching of the pulse signals starting from when the sliding door 12 is at a reference position (for example, a fully closed position), and outputs the position signal P. For example, the reference position of the sliding door 12 is detected by a fully-closed-state detecting switch 46. This fully-closed-state detecting switch 46 is a switch for detecting that the door position of the sliding door 12 is at the "fully closed position", and is a limit switch which is turned on when the door position is at the "fully closed position", for example.

The rotation control unit 54 determines a command value for a duty ratio such that the moving velocity of the sliding door 12 follows the target velocity set in advance while the sliding door 12 is being opened and closed, and controls the moving velocity of the sliding door 12 by executing energizing control over the electric motor 21 based on the determined command value when controlling driving of the electric motor 21 for opening and closing the sliding door 12. Calculation of the command value for a duty ratio is executed by the rotation control unit 54 as follows. That is, the rotation control unit 54 calculates the command value for a duty ratio through proportional control and integral control based on the moving velocity of the sliding door 12 (velocity of the velocity signal V) and a target velocity Vc which is set in advance through an experiment or design and is stored in the storage unit 57. The rotation control unit 54 calculates a command value x for a duty ratio of the drive signals G1 to G6 through proportional integral (PI) computation of x=kp (V−Vc)+kiΣ(V−Vc) based on a moving velocity V and the target velocity Vc of the sliding door 12. Here, the factor kp indicates a proportional gain, and the factor ki indicates an integral gain. According to this PI control, even if the difference between the moving velocity V and the target velocity Vc becomes zero due to accumulated deviations between the moving velocity V and the target velocity Vc of the sliding door 12, the command value x does not become zero. Therefore, stable velocity control can be performed. In addition, when no particular limit is provided, the command value x for a duty ratio becomes 0% or smaller (that is, a negative value), or becomes 100% or greater. However, description will hereinafter be given on condition that the command value x for a duty ratio is limited to an upper limit of 100%. For example, the command value x for a duty ratio becomes 0% or smaller when a certain time elapses in a state in which the moving velocity of the sliding door 12 exceeds the target velocity. Based on the rotation direction indicated by the direction signal D, the rotation control unit 54 outputs PWM command signals corresponding to the same direction to the driver circuit 51. The storage unit 57 stores the target velocity Vc in association with the position of the sliding door 12 indicated by the position signal P and the moving direction of the sliding door 12 indicated by the direction signal D.

Figure 4:
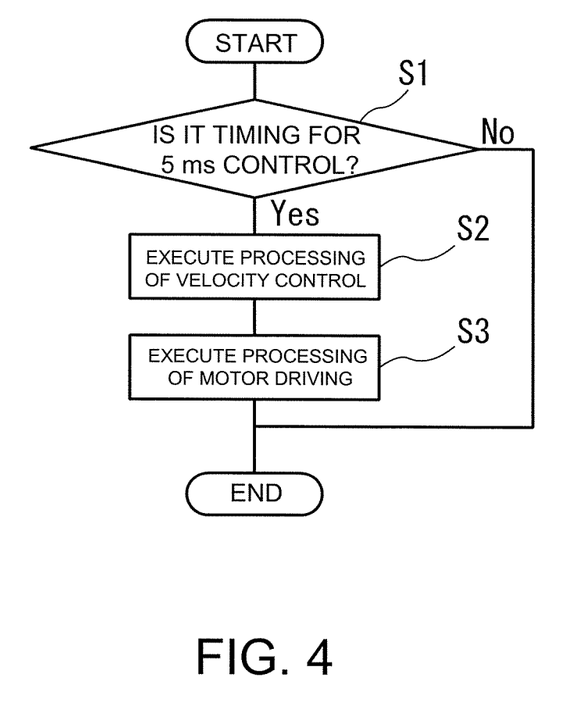
FIG. 4 is a flowchart showing a main routine of processing executed by a rotation control unit illustrated in FIG. 3.

Next, with reference to FIGS. 4 to 12 and Table 1, an operational example of the rotation control unit 54 will be described. FIG. 4 is a flowchart showing a main routine of processing executed by the rotation control unit 54. For example, the processing shown in FIG. 4 is repetitively executed in a cycle sufficiently shorter than 5 ms, for example, while the rotation control unit 54 controls driving of the electric motor 21. First, the rotation control unit 54 determines whether or not it is timing for 5 ms control (Step S1). The expression of whether or not it is timing for 5 ms control denotes whether or not it is timing for starting processing executed every 5 ms. When 5 ms elapses from the previous execution timing, the rotation control unit 54 determines that it is the timing for 5 ms control (Yes in Step S1), and then executes the processing in Steps S2 and S3. When the rotation control unit 54 determines that it is not the timing for 5 ms control (No in Step S1), the rotation control unit 54 does not execute the processing in Steps S2 and S3 and ends the processing.

In the processing of velocity control in Step S2, as described above, the rotation control unit 54 determines the command value for a duty ratio such that the moving velocity of the sliding door 12 follows the target velocity set in advance while the sliding door 12 is being opened and closed.

Next, in the processing of motor driving in Step S3, the rotation control unit 54 executes processing of driving the electric motor 21 based on an output signal of the door opening/closing information generating unit 52, an output signal of the opening/closing switch 45, and the command value for a duty ratio determined in Step S2. For example, the rotation control unit 54 executes processing of starting driving of the electric motor 21, temporarily stopping the driving, or canceling the temporary stop.

In addition, the rotation control unit 54 executes processing for generating and outputting PWM command signals (signals corresponding to the drive signals G1 to G6) to be output to the driver circuit 51, based on the command value for a duty ratio determined through the processing of velocity control in Step S2 shown in FIG. 4, and the direction signal D. At this time, as illustrated in Table 1, the rotation control unit 54 executes processing of selectively switching the driving method for the transistors 42a to 42f in the drive circuit section 42 among a plurality of driving methods of which braking forces are different from each other, in accordance with the command value for a duty ratio. In the present embodiment, improvement in performance of controlling a braking force (increase of braking force, improvement of accuracy, and the like) can be achieved by switching the driving method. In this case, the rotation control unit 54 switches the driving method for the drive circuit section 42 to any one of a driving method using a PWM which is not a complementary PWM, a driving method using a complementary PWM, and a driving method in which duty control is executed when all the upper stage transistors 42a to 42c or all the lower stage transistors 42d to 42f are caused to be in a turned-on state, in accordance with the command value for a duty ratio.

Table 1 is a table showing a corresponding relationship between command values for a duty ratio and driving methods in the present embodiment.

| COMMAND VALUES FOR DUTY RATIO | DRIVING METHODS |
|---|---|
| MAXIMUM DUTY OF COMPLEMENTARY PWM TO 100% | DRIVING OUTPUT WITHOUT COMPLEMENTARY PWM |
| 1% TO MAXIMUM DUTY OF COMPLEMENTARY PWM | DRIVING/BRAKING OUTPUT BY COMPLEMENTARY PWM |
| 0% | DRIVING STOP |
| SMALLER THAN 0% | ALL LOWER STAGE (OR UPPER STAGE) TRANSISTORS ARE TURNED ON BRAKING BASED ON PWM OUTPUT |

Table 1 is a table showing a corresponding relationship between command values for a duty ratio and driving methods when the rotation control unit 54 generates and outputs PWM command signals.

Figure 5:
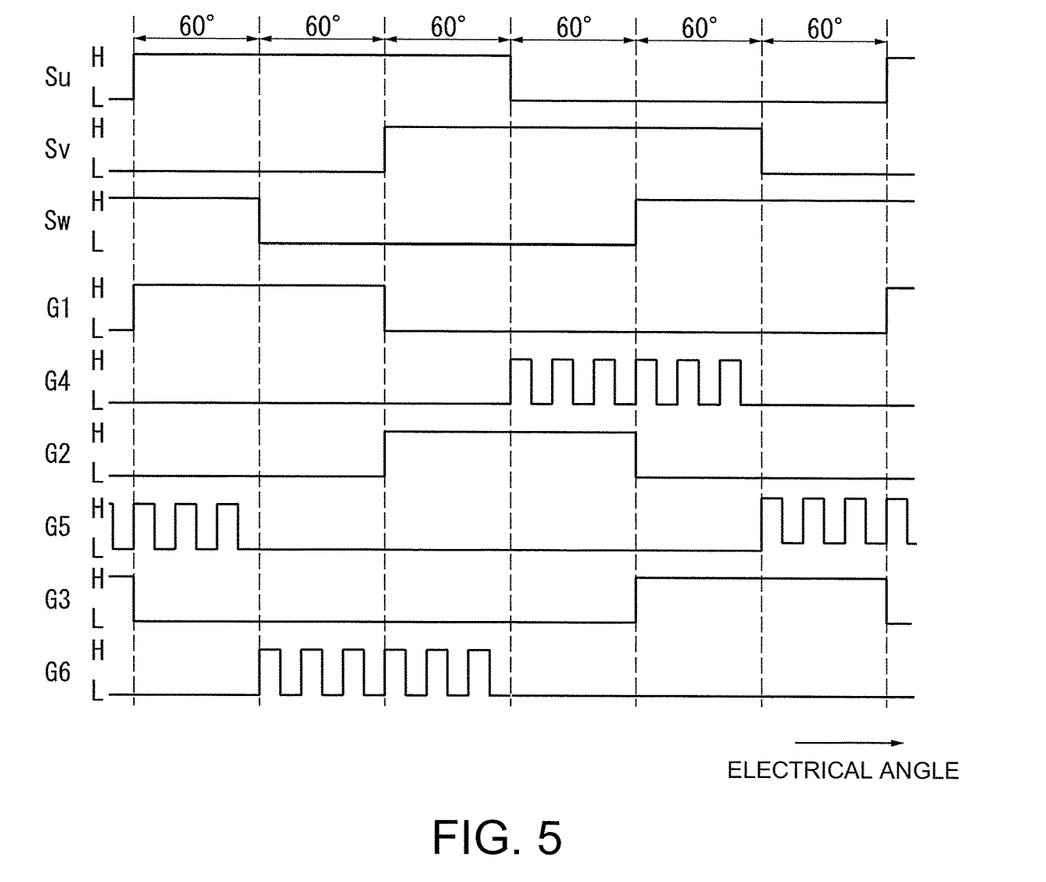
FIG. 5 is a timing chart illustrating an operational example of the present embodiment.
Figure 6:
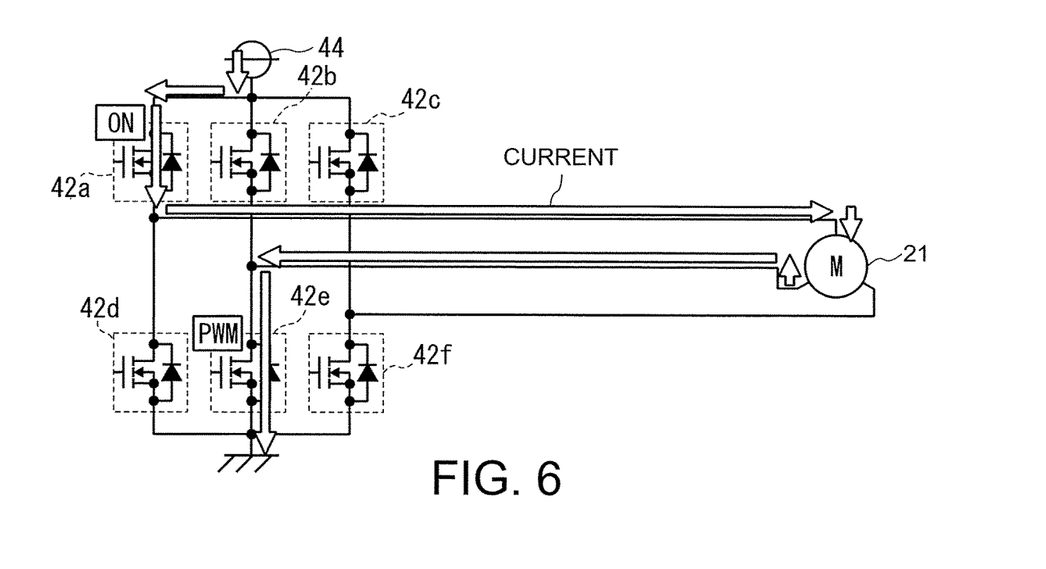
FIG. 6 is a schematic view for describing an operational example of the present embodiment.

As illustrated in Table 1, when the command value for a duty ratio ranges from maximum duty of complementary PWM to 100%, a driving method in which the electric motor 21 is in a drive state based on a driving output without complementary PWM is selected. The maximum duty of complementary PWM is a command value for a duty ratio to be a threshold value for switching between the driving methods of using no complementary PWM and using a complementary PWM. In the case of the driving output without complementary PWM, for example, as illustrated in FIG. 5, in accordance with the timing when the pulse signals Su, Sv, and Sw change, the upper stage transistors 42a to 42c (drive signals G1 to G3) are controlled to be turned on (H) or off (L), and the lower stage transistors 42d to 42f (drive signals G4 to G6) are turned on (H) or off (L) through PWM control. FIG. 5 is a timing chart illustrating changes of the pulse signals Su, Sv, and Sw and the drive signals G1 to G6. In the horizontal axis, the rotation position of the rotor 47 is expressed as an electrical angle. In this case, the energization pattern changes every 60° of the electrical angle. FIG. 6 illustrates an operational state of the drive circuit section 42 and the electric motor 21 in the energization pattern of the region of 60° at the left end. In this case, a current is energized through a course of the DC power source 44 (positive electrode), the transistor 42a, the electric motor 21, the transistor 42e, and the ground (grounding). When the turned-on time of a PWM is lengthened (when the duty ratio corresponding to the energization ratio from the DC power source 44 increases), the driving output becomes stronger.

Figure 7:
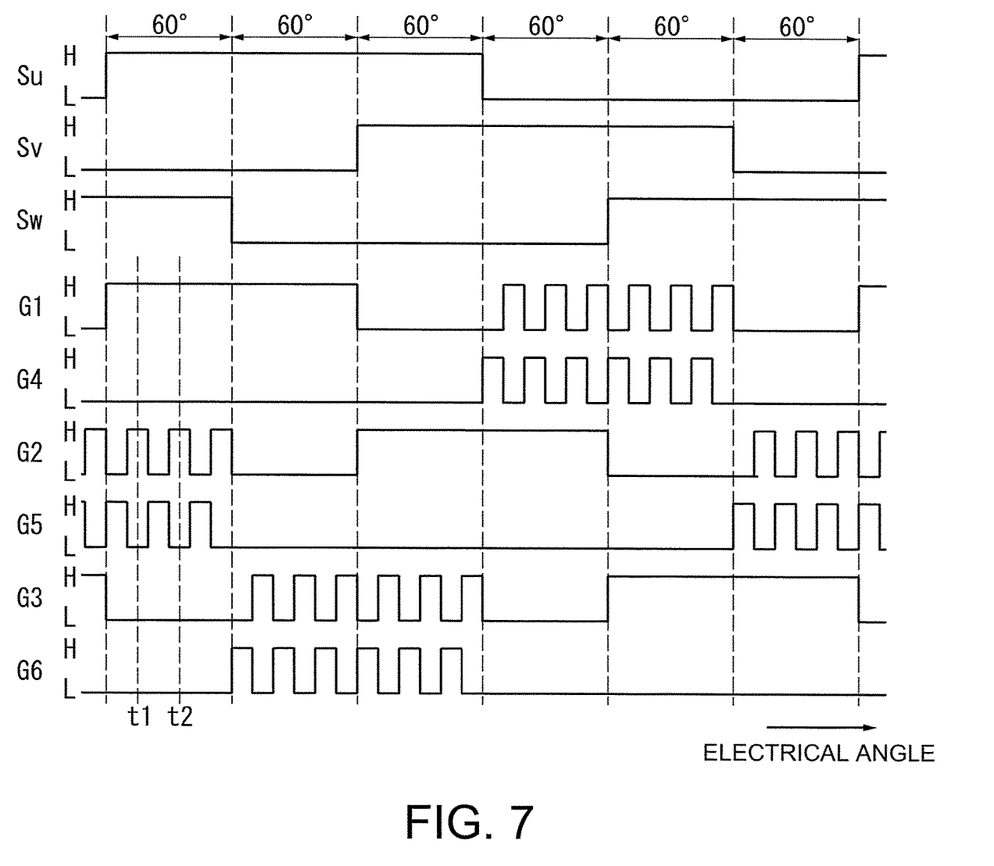
FIG. 7 is a timing chart illustrating an operational example of the present embodiment.
Figure 8:
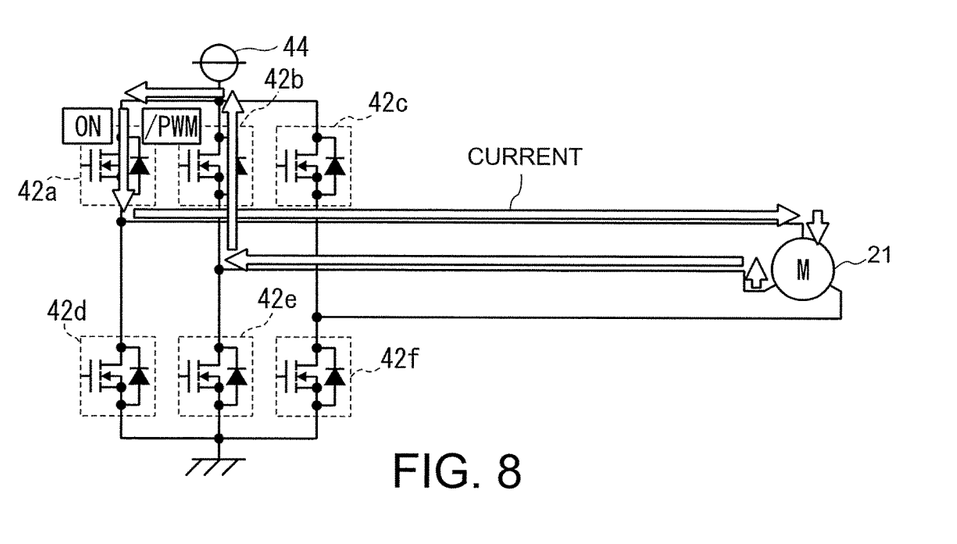
FIG. 8 is a schematic view for describing an operational example of the present embodiment.

Next, as illustrated in Table 1, when the command value for a duty ratio ranges from 1% to the maximum duty of complementary PWM, a driving method in which the electric motor 21 is in a drive state or a brake state based on a driving output or a braking output using a complementary PWM is selected. In the case of the driving output or the braking output using a complementary PWM, for example, as illustrated in FIG. 7, in accordance with the timing when the pulse signals Su, Sv, and Sw change, the upper stage transistors 42a to 42c (drive signals G1 to G3) are turned on (H) or off (L) or turned on (H) or off (L) through PWM control, and the lower stage transistors 42d to 42f (drive signals G4 to G6) are turned on (H) or off (L) through PWM control. In this case, the turned-on (H) or turned-off (L) state of the upper stage transistors 42a to 42c through PWM control and the turned-on (H) or turned-off (L) state of the lower stage transistors 42d to 42f through PWM control are controlled to have a reverse phase relationship in the same period. FIG. 7 is a timing chart illustrating changes of the pulse signals Su, Sv, and Sw and the drive signals G1 to G6. In the horizontal axis, the rotation position of the rotor 47 is expressed as the electrical angle. In this case, the energization pattern changes every 60° of the electrical angle. FIG. 8 illustrates an operational state of the drive circuit section 42 and the electric motor 21 in the energization pattern at a time t2 in FIG. 7. In this case, a current flows in a circuit formed by the electric motor 21, the transistor 42a, and the transistor 42b. Due to a regenerative current, the electric motor 21 is in a brake state. In addition, since the electric motor 21 is not connected to the ground, no current flows from the DC power source 44. Meanwhile, the operational state of the drive circuit section 42 and the electric motor 21 in the energization pattern at a time t1 in FIG. 7 is the same as that in the case described above with reference to FIG. 6. In the case of the driving output or the braking output using a complementary PWM, when the turned-on time of a PWM in a braking output illustrated in FIG. 8 is lengthened (when the duty ratio corresponding to the energization ratio from the DC power source 44 is reduced), the braking force becomes stronger.

Next, as illustrated in Table 1, when the command value for a duty ratio is 0%, a driving method in which the electric motor 21 is in a brake state by turning off all the transistors 42a to 42f is selected.

Figure 9:
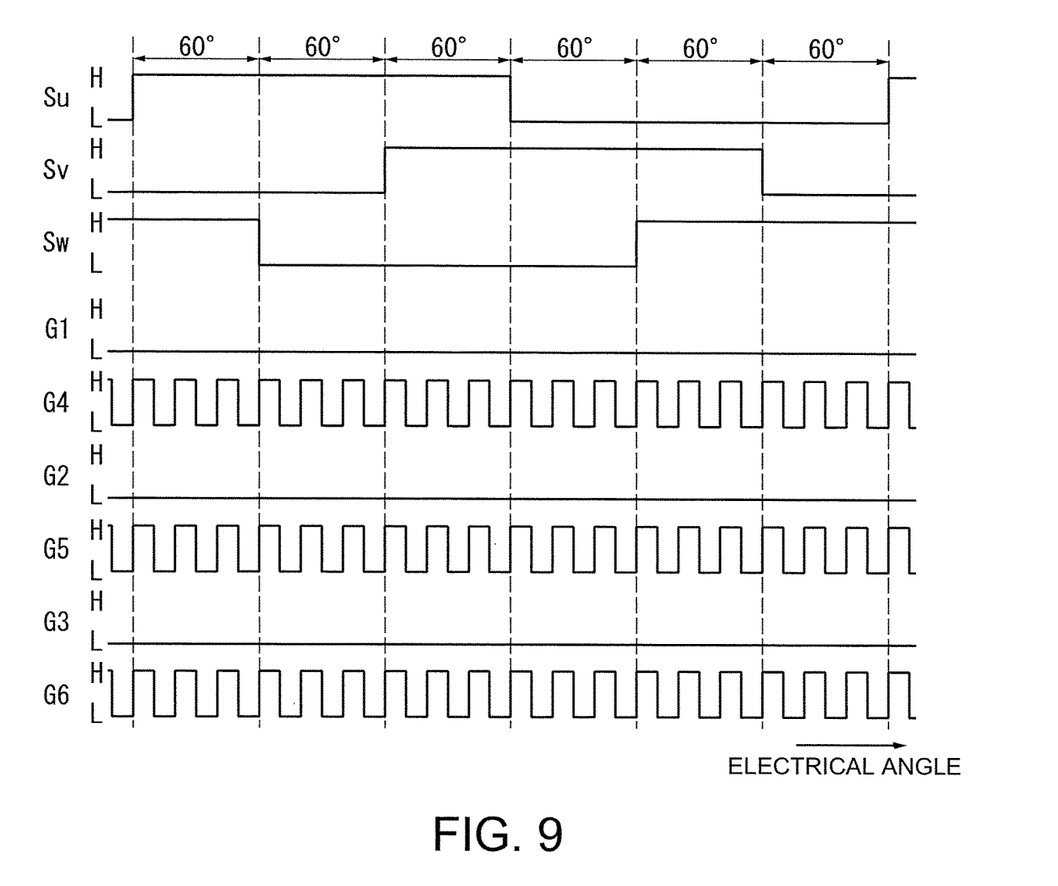
FIG. 9 is a timing chart illustrating an operational example of the present embodiment.
Figure 10:
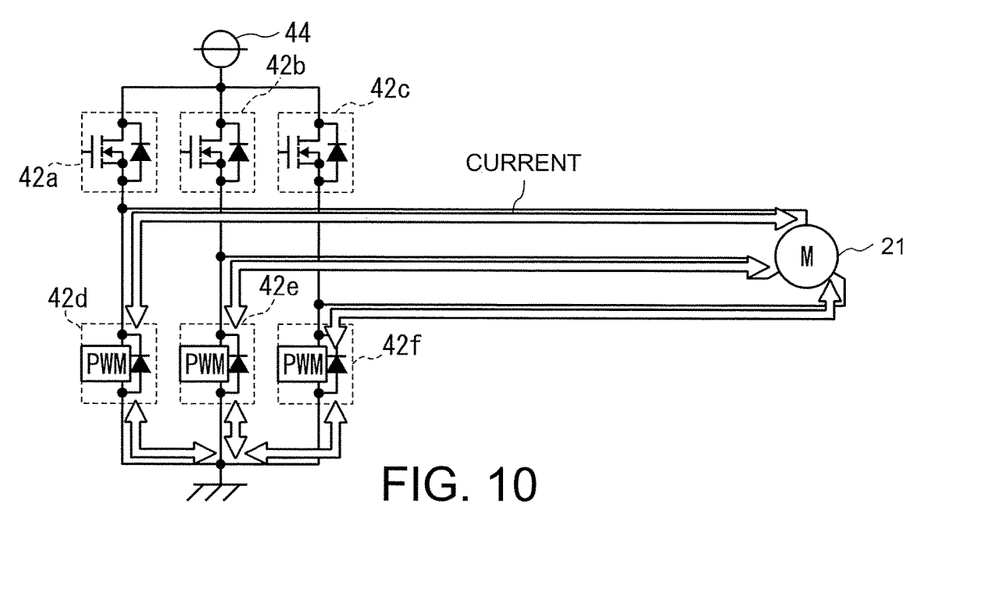
FIG. 10 is a schematic view for describing an operational example of the present embodiment.

Next, as illustrated in Table 1, when the command value for a duty ratio is smaller than 0%, a driving method in which the electric motor 21 is in a brake state by turning on all the lower stage (or the upper stage) transistors at the same time and controlling the turned-on time based on a PWM output is selected. In this driving method, for example, as illustrated in FIG. 9, at all times, the upper stage transistors 42a to 42c (drive signals G1 to G3) are all turned off (L) and the lower stage transistors 42d to 42f (drive signals G4 to G6) are turned on (H) or off (L) through PWM control. In this case, the turned-on (H) or turned-off (L) state of the lower stage transistors 42d to 42f through PWM control is executed continuously in the same phase. FIG. 9 is a timing chart illustrating changes of the pulse signals Su, Sv, and Sw and the drive signals G1 to G6. In the horizontal axis, the rotation position of the rotor 47 is expressed as the electrical angle. In this case, the energization pattern is the same every 60° of the electrical angle. However, the energization pattern may vary. FIG. 10 illustrates an operational state of the drive circuit section 42 and the electric motor 21 in the energization patterns illustrated in FIG. 9. In this case, a current flows in a circuit formed by the electric motor 21 and the transistors 42d to 42f. Due to a regenerative current, the electric motor 21 is in a brake state. In addition, since the electric motor 21 is not connected to the DC power source 44, no current flows from the DC power source 44. In the case of the braking output in this driving method, when the turned-on time of a PWM illustrated in FIG. 9 is lengthened, the braking force becomes stronger. In addition, in the case of the complementary PWM as illustrated in FIG. 7, there is a need to set a dead time such that the upper stage transistors 42a to 42c and the lower stage transistors 42d to 42f are not turned on at the same time when switching between a driving output and a braking output. In contrast, in this driving method, since the electric motor 21 is in a braking output state by causing only the lower stage transistors 42d to 42f (or the upper stage transistors 42a to 42c) to be in a turned-on state, the output time corresponding to the dead time can be allocated to the braking output. Accordingly, it is possible to acquire a braking output greater than the complementary PWMs.

Figure 11:
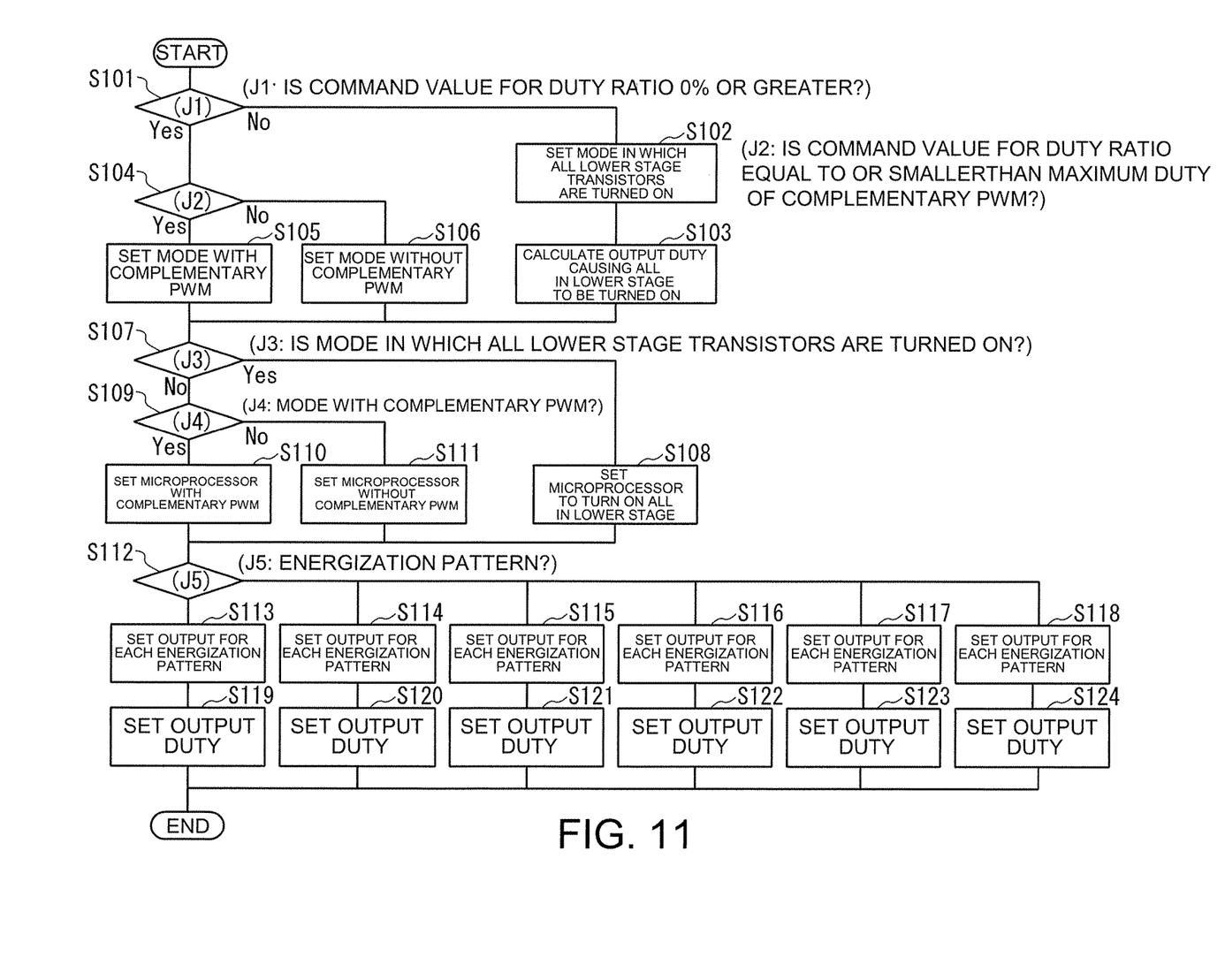
FIG. 11 is a flowchart illustrating an example of processing executed by the rotation control unit illustrated in FIG. 3.

Next, with reference to FIG. 11, processing in which the rotation control unit 54 generates and outputs PWM command signals will be described. FIG. 11 is a flowchart illustrating an example of processing in which the rotation control unit 54 generates and outputs PWM command signals. The rotation control unit 54 executes the processing illustrated in FIG. 11, for example, in a manner synchronized with a rising phase and a falling phase of the pulse signals Su, Sv, and Sw.

In the flowchart illustrated in FIG. 11, the rotation control unit 54 determines whether or not the command value for a duty ratio calculated through the processing of velocity control (Step S2) in FIG. 4 is 0% or greater (J1) (Step S101). When the command value for a duty ratio is not 0% or greater (when No in Step S101), the rotation control unit 54 sets the driving method to a mode in which all the lower stage transistors 42d to 42f are turned on (Step S102). Subsequently, the output duty (turned-on time ratio in FIG. 9) in the driving method in which all the lower stage transistors 42d to 42f are turned on is calculated based on the command value for a duty ratio (Step S103). Meanwhile, when the command value for a duty ratio is 0% or greater (when Yes in Step S101), the rotation control unit 54 determines whether or not the command value for a duty ratio is equal to or smaller than the maximum duty of the complementary PWM (J2) (Step S104).

When the command value for a duty ratio is equal to or smaller than the maximum duty of the complementary PWM (when Yes in Step S104), the rotation control unit 54 sets the driving method to a mode of using a complementary PWM (Step S105). On the other hand, when the command value for a duty ratio is not equal to or smaller than the maximum duty of the complementary PWM (when No in Step S104), the rotation control unit 54 sets the driving method to a mode of using no complementary PWM (Step S106).

After Step S103, S105, or S106, the rotation control unit 54 determines whether or not the driving method is set to a mode in which all lower stage transistors are turned on (J3) (Step S107). When the driving method is set to the mode in which all lower stage transistors are turned on (when Yes in Step S107), the rotation control unit 54 sets the microprocessor (control unit 53) such that all the lower stage transistors 42d to 42f are synchronized and turned on (Step S108). In Step S108, the rotation control unit 54 causes the upper stage transistors 42a to 42c to be turned off at all times and sets the microprocessor (control unit 53) such that the remaining transistors are also turned on at the time when any transistor in the lower stage transistors 42d to 42f is turned on, regardless of the output setting in Steps S113 to S118 described below.

Meanwhile, when the driving method is not set to the mode in which all lower stage transistors are turned on (when No in Step S107), the rotation control unit 54 determines whether or not the driving method is set to the mode of using a complementary PWM (J4) (Step S109). When the driving method is set to the mode of using a complementary PWM (when Yes in Step S109), the rotation control unit 54 sets the microprocessor (control unit 53) such that a PWM command signal is generated using a complementary PWM (Step S110). On the other hand, when the driving method is not set to the mode of using a complementary PWM (when No in Step S109), the rotation control unit 54 sets the microprocessor (control unit 53) such that a PWM command signal is generated without complementary PWM (Step S111).

After Step S108, S110, or S111, the rotation control unit 54 determines the energization pattern based on the pulse signals Su, Sv, and Sw (J5) (Step S112). In Step S112, based on the pulse signals Su, Sv, and Sw, the rotation control unit 54 determines which energization pattern corresponding to which angle range in the electrical angle 360° (for example, which 60° region) is to be selected.

Next, the rotation control unit 54 sets the output for each energization pattern (Steps S113 to S118) and sets the output duty (Steps S119 to S124) based on the determination result of the energization pattern (Step S112). Here, as an example, Step S113 corresponds to the energization pattern in the section of 60° at the left end illustrated in FIG. 5, 7, or 9, and Step S114 corresponds to the energization pattern in the section of 60° second next to the right from the section of 60° at the left end illustrated in FIG. 5, 7, or 9. In this case, in Step S113, the rotation control unit 54 sets the PWM command signal corresponding to a drive signal G1 (which will hereinafter be referred to as the drive signal G1 (the same also applies to other signals)) to be turned on, a drive signal G2 to be turned off, a drive signal G3 to be turned off, a drive signal G4 to be turned off, a drive signal G5 to be a PWM output, and a drive signal G6 to be turned off. Subsequently, in Step S119, the rotation control unit 54 sets the duty ratio for PWM control to the command value for a duty ratio calculated in Step S2 of FIG. 4 or the output duty calculated in Step S103. In the processing described above, the rotation control unit 54 can make the drive signals G1 to G6 be the signals corresponding to the driving method illustrated in FIG. 5, 7, or 9. In addition, in this example, in Step S114, the rotation control unit 54 sets the drive signal G1 to be turned on, the drive signal G2 to be turned off, the drive signal G3 to be turned off, the drive signal G4 to be turned off, the drive signal G5 to be turned off, and the drive signal G6 to be a PWM output. Subsequently, in Step S120, the rotation control unit 54 sets the duty ratio for PWM control to the command value for a duty ratio calculated in Step S2 of FIG. 4 or the output duty calculated in Step S103. In the processing described above, the rotation control unit 54 can make the drive signals G1 to G6 be the signals corresponding to the driving method illustrated in FIG. 5, 7, or 9.

In addition, when the command value for a duty ratio is 0%, Yes is selected in Step S101, Yes is selected in Step S104, the driving method using a complementary PWM is set in Step S105, No is selected in Step S107, Yes is selected in Step S109, the microprocessor is set to use a complementary PWM in Step S110, and the energization pattern is set in Steps S113 to S118, the output duty is set to 0% in Steps S119 to S124. Therefore, the drive signals G1 to G6 is turned off (L).

Figure 12:
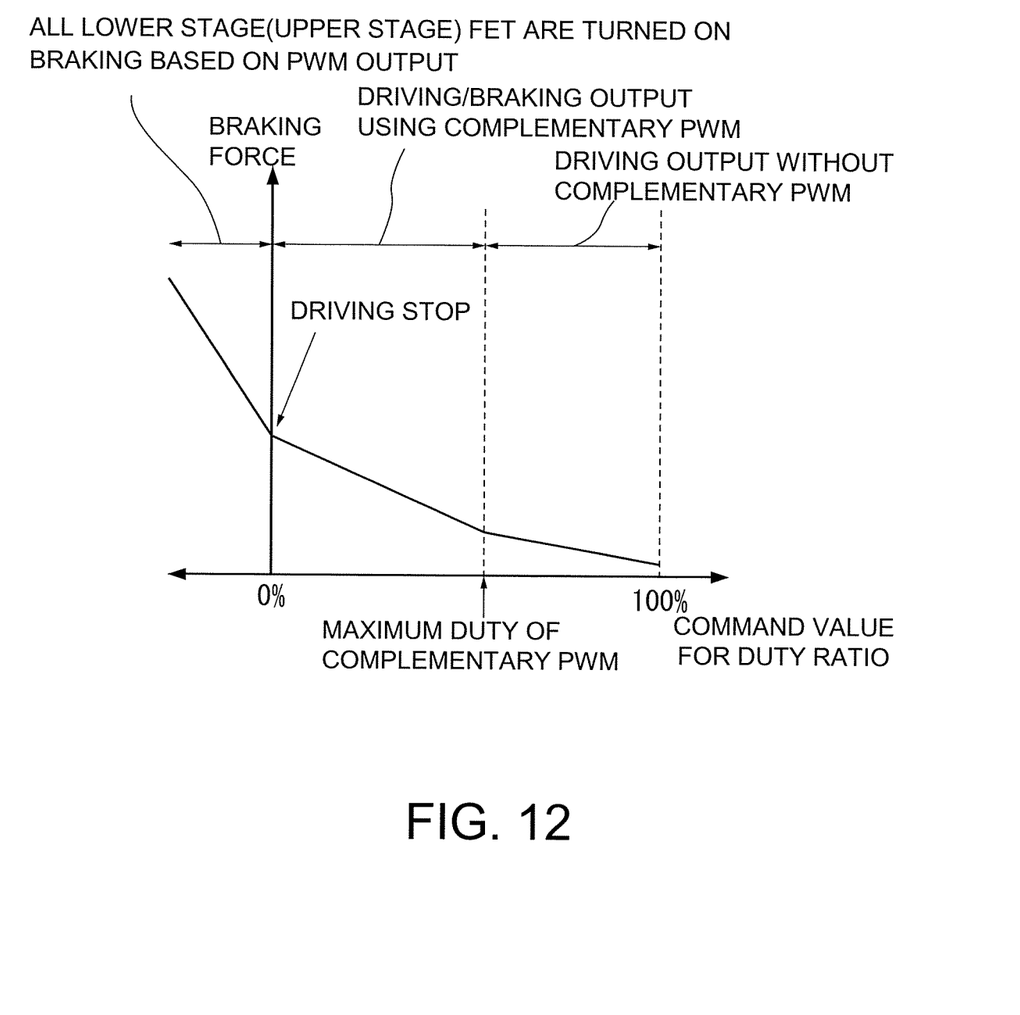
FIG. 12 is a view schematically illustrating a relationship between the command value for a duty ratio and a braking force of the electric motor in the present embodiment.

As described above, for example, as illustrated in FIG. 12, the control unit 53 can control the braking force based on the command value for a duty ratio in velocity control. FIG. 12 is a view schematically illustrating a relationship between the command value for a duty ratio and a braking force of the electric motor 21 in velocity control. The command value of a duty ratio for changing the driving method is not limited to the relationship illustrated in FIG. 12. For example, a driving stop position may correspond to a value other than 0%.

The configuration and the operational example described above are examples. For example, in the examples illustrated in FIGS. 5, 7, and 9, the energization angle is set to 120°. However, the energization angle is not limited thereto. In addition, the value for an advance angle can be changed. In addition, the switching elements are not limited to FET (field effect transistor), and an insulated gate bipolar transistor (IGBT) or the like may be used. In addition, in the examples illustrated in FIGS. 9 and 10, all the lower stage transistors 42d to 42f are in a turned-on state. However, all the upper stage transistors 42a to 42c may be in a turned-on state.

As described above, according to the motor control device 41 of the present embodiment, the control unit 53 causes all the upper stage transistors 42a to 42c or all the lower stage transistors 42d to 42f to be in a turned-on state in accordance with the command value for a duty ratio through velocity control, thereby controlling driving of the electric motor 21. Therefore, it is possible to generate a braking force greater than a braking output using a complementary PWM. Accordingly, even when an opening/closing object is heavy or the like, its velocity can be prevented from being faster than the target velocity, and velocity control over a sliding door can be accurately performed.

In addition, according to the motor control device 41 of the present embodiment, when the control unit 53 causes all the upper stage transistors 42a to 42c or all the lower stage transistors 42d to 42f to be in a turned-on state in accordance with the command value for a duty ratio through velocity control, duty control is executed. Therefore, it is possible to improve the followability with respect to the target velocity.

In addition, according to the motor control device 41 of the present embodiment, the control unit 53 switches the driving method for the upper stage transistors 42a to 42c and the lower stage transistors 42d to 42f to any one of the driving method using a PWM which is not a complementary PWM, the driving method using a complementary PWM, and a driving method in which duty control is executed when all the upper stage transistors 42a to 42c or all the lower stage transistors 42d to 42f are caused to be in a turned-on state, in accordance with the command value for a duty ratio through velocity control. Therefore, compared to when no switching is performed, velocity control over a sliding door can be accurately performed.

In the related art, there have been cases in which the velocity of a sliding door cannot be controlled (while exceeding the target velocity) by only performing PWM control in the related art, when the sliding door is heavy in weight in a situation in which the sliding door is accelerated due to an external force, for example, a situation in which the door is controlled to stop on a steep slope. Therefore, a dead time is provided in the complementary PWM such that the upper stage FET and the lower stage FET are not turned on at the same time. That is, since the electric motor is in a free state during the time corresponding to the dead time and neither the driving output nor the braking output can be executed, there is a possibility that the velocity of the sliding door will not be able to be controlled, for example, when the sliding door becomes heavy in weight. In contrast, in the present embodiment, when a computation result in which the command value for a duty ratio of the driving output is smaller than 0% in control computation through velocity control, it is possible to exhibit a braking force stronger than the complementary PWM by stopping the complementary PWMs from being output and outputting the PWMs using either the upper stage transistors or the lower stage transistors. In the state according to this driving method, the braking output is executed but no driving output is executed. When using the complementary PWM, since the limit of the braking output is "output one cycle of dead time", it is not possible to execute the complete braking output only. In contrast, in the present embodiment, when the computation result of velocity control is only braking output, it is possible realize a stronger braking output by stopping the complementary PWMs, causing all the lower stage transistors (or all the upper stage transistors) to be in a turned-on state, and performing PWM control over the turned-on time. That is, the output time corresponding to the dead time can be allocated to the braking output.

According to the present embodiment, for example, acceleration of a control target due to an external force can be restricted by changing the output method without changing the physical constitution of the electric motor. In addition, the driving/braking force can be controlled by dynamically changing the output method of the electric motor based on an internal computation result of an output value. Therefore, it is possible to be easily employed in existing configurations.

Hereinabove, the embodiment and its deformation examples of the present disclosure have been described. The motor control device of the embodiments of the present disclosure is not limited to the illustrated examples described above. Naturally, it is possible to add various changes within the scope without departing from the gist of the present disclosure.

What is claimed is:

1. A motor control device having a control unit which determines a command value for a duty ratio that is a ratio of a time during which a power source energizes an electric motor to a predetermined control cycle such that a moving velocity of a sliding door of a vehicle follows a target velocity set in advance while the sliding door is being opened and closed, and controls the moving velocity of the sliding door by executing energizing control over the electric motor based on the determined command value when controlling driving of the electric motor for opening and closing the sliding door, the motor control device comprising:
   a plurality of upper stage switching elements, connected between terminals of windings of the electric motor and the power source; and
   a plurality of lower stage switching elements, connected between the terminals and a ground potential,
   wherein the control unit causes all the upper stage switching elements or all the lower stage switching elements to be switched between a turned-on state and a turned-off state synchronously when the command value indicates that a certain time elapses in a state in which the moving velocity of the sliding door exceeds the target velocity,
   wherein the control unit causes all the upper stage switching elements or all the lower stage switching elements to be turned-on state when the command value for the duty ratio is smaller than 0%,
   wherein the electric motor has a plurality of short-circuiting input terminals, and the motor control device generates a regenerative brake force by the short-circuiting input terminal,
   wherein a reference position of the sliding door is detected by a fully-closed-state detecting switch electrically connected the control unit to determine when the sliding door is fully closed, wherein the fully-closed-state detecting switch is configured for detecting the sliding door at a fully closed position thereof, and the fully-closed state detecting switch is a limit switch which is turned on when the sliding door is at the fully closed position,
   wherein the control unit executes duty control when all the upper stage switching elements or all the lower stage switching elements are caused to be in the turned-on state in accordance with the command value,
   wherein, in accordance with the command value, the control unit switches a driving method for the plurality of upper stage switching elements or for the plurality of lower stage switching elements to a driving method comprising:
   using a pulse width modulation which is not a complementary pulse width modulation;
   using a complementary pulse width modulation with a plurality of transistors connected in series, wherein an operation mode in which the plurality of transistors connected in series in bridge connection have a reverse phase relationship in a same time period,
   wherein a maximum duty of the complementary pulse width modulation is the command value for the duty ratio to be a threshold value for switching the driving method between using no complementary pulse width modulation and using the complementary pulse width modulation,
   wherein the electric motor is in a drive state or a brake state based on a driving output or a braking output using the complementary pulse width modulation; and
   executing duty control when all the upper stage switching elements or all the lower stage switching elements are caused to be in the turned-on state.

* * * * *